United States Patent
Henri et al.

(10) Patent No.: US 12,039,618 B2
(45) Date of Patent: Jul. 16, 2024

(54) SYSTEM, DEVICE, AND METHOD FOR MODE-BASED ENERGY STORAGE MANAGEMENT

(71) Applicants: TOTAL SOLAR INTERNATIONAL, Courbevoie (FR); NORTH CAROLINA STATE UNIVERSITY, Raleigh, NC (US)

(72) Inventors: Gonzague Henri, Raleigh, NC (US); Ning Lu, Cary, NC (US)

(73) Assignees: TOTAL SOLAR INTERNATIONAL, Courbevoie (FR); NORTH CAROLINA STATE UNIVERSITY, Raleigh, NC (US)

( * ) Notice: Subject to any disclaimer, the term of this patent is extended or adjusted under 35 U.S.C. 154(b) by 388 days.

(21) Appl. No.: 16/632,784

(22) PCT Filed: Jul. 21, 2017

(86) PCT No.: PCT/US2017/043311
§ 371 (c)(1),
(2) Date: Jan. 21, 2020

(87) PCT Pub. No.: WO2019/017968
PCT Pub. Date: Jan. 24, 2019

(65) Prior Publication Data
US 2020/0211128 A1 Jul. 2, 2020

(51) Int. Cl.
H02J 7/00 (2006.01)
G06Q 50/06 (2012.01)
(52) U.S. Cl.
CPC ............ *G06Q 50/06* (2013.01); *H02J 7/0071* (2020.01); *H02J 7/007188* (2020.01); *Y04S 10/50* (2013.01)

(58) Field of Classification Search
USPC ........................................................ 700/291
See application file for complete search history.

(56) References Cited

U.S. PATENT DOCUMENTS

| 2011/0273130 A1* | 11/2011 | Lee .......................... H02J 3/44 320/101 |
| 2014/0049109 A1 | 2/2014 | Kearns et al. |

(Continued)

FOREIGN PATENT DOCUMENTS

| CN | 2884653 Y * | 3/2007 |
| CN | 104993522 A | 10/2015 |

(Continued)

OTHER PUBLICATIONS

International Search Report and Written Opinion issued on Mar. 21, 2018 in PCT/US2017/043311 filed on Jul. 21, 2017.

(Continued)

*Primary Examiner* — Emilio J Saavedra
(74) *Attorney, Agent, or Firm* — Oblon, McClelland, Maier & Neustadt, L.L.P.

(57) ABSTRACT

A method, system, and device for controlling an energy storage device are provided. The method includes determining an operating schedule for the energy storage device based on at least an initial cost. The initial cost is a function of at least a load profile and a power production profile of at least one renewable energy source associated with the energy storage device. The operating schedule is for a predetermined period. The method further includes determining an updated cost based on at least the operating schedule, identifying an operating mode from a plurality of operating modes for a predetermined operating period based on the updated cost and the operating schedule; and operating using the operating mode for the predetermined operating period.

19 Claims, 9 Drawing Sheets

(56) References Cited

U.S. PATENT DOCUMENTS

| | | | |
|---|---|---|---|
| 2014/0052305 A1 | 2/2014 | Kearns et al. | |
| 2014/0129040 A1* | 5/2014 | Emadi | G06Q 50/06 |
| | | | 700/291 |
| 2014/0236369 A1 | 8/2014 | Kearns et al. | |
| 2014/0350743 A1* | 11/2014 | Asghari | G05B 13/048 |
| | | | 700/297 |
| 2015/0248118 A1 | 9/2015 | Li et al. | |
| 2016/0211664 A1* | 7/2016 | Subbotin | H02J 3/00 |
| 2016/0342170 A1 | 11/2016 | Kearns et al. | |
| 2017/0288413 A1* | 10/2017 | Varadarajan | H02J 7/00 |
| 2017/0300019 A1 | 10/2017 | Blackhall et al. | |
| 2019/0237826 A1* | 8/2019 | Ida | H01M 10/443 |
| 2020/0033933 A1* | 1/2020 | Wang | H02J 3/48 |

FOREIGN PATENT DOCUMENTS

| | | | |
|---|---|---|---|
| JP | 2017022918 A * | 1/2017 | |
| WO | WO 2016/040991 A1 | 3/2016 | |

OTHER PUBLICATIONS

Office Action issued Mar. 27, 2023 in corresponding Chinese Application No. 201780093886.0, with an English translation.
Combined Chinese Office Action and Search Report issued Sep. 27, 2023 in Chinese Patent Application No. 201780093886.0, 7 pages.
Office Action issued Jan. 11, 2024 in Chinese Application No. 201780093886.0, and an English translation (10 pages).

* cited by examiner

SYSTEM, DEVICE, AND METHOD FOR MODE-BASED ENERGY STORAGE MANAGEMENT

BACKGROUND

High penetration of residential and commercial rooftop photovoltaic (PV) systems has significantly increased the need for installing energy storage devices (ESDs). ESDs can also increase power system reliability, improve power quality, and facilitate the use of self-generated electricity. In Germany, the feed-in-tariff is low as described in P. Denholm and R. Margolis, "Energy Storage Requirements for Achieving 50% Solar Photovoltaic Energy Penetration in California," *National renewable energy laboratory (NREL)*, August, 2016. In Hawaii, backfeeding is no longer allowed for newly installed PV systems. These trends make ESDs an increasingly attractive option for residential PV systems.

Optimization methods are widely used for energy storage management. The optimization objectives can be minimizing electricity bills, self-consuming solar energy, or providing different types of grid services. For example, a method to maximize the value of the ESD for multiple objectives, such as voltage regulation, peak power reduction, and cost of electricity is described in J. Tant, F. Geth, D. Six, P. Tant, and J. Driesen, "Multiobjective battery storage to improve PV integration in residential distribution grids," *IEEE Trans. Sustain. Energy*, vol. 4, no. 1, pp. 182-191, 2013. A comparison between Mixed Integer Linear Programming (MILP) and a fuzzy logic approach for managing ESDs is described in Zhi Wu, Xiao-Ping Zhang, J. Brandt, Su-Yang Zhou, and Jia-Ning Li, "Three control approaches for optimized energy flow with home energy management system," *IEEE Power Energy Technol. Syst. J.*, vol. 2, no. 1, pp. 21-31, 2015.

Although using optimization-based approaches may yield better performance, those algorithms require accurate load and PV forecasts. In addition, the energy storage control may need to be customized for each type of user and for different utility rate structures. Multi-stage algorithms allow an optimal schedule to be developed based on 24-hour forecast and to adjust the schedule every hour or every few minutes to cope with inaccuracy in forecasted values. Exemplary multistage algorithms are described in M. C. Bozchalui, S. A. Hashmi, H. Hassen, C. A. Cañizares, and K. Bhattacharya, "Optimal operation of residential energy hubs in smart grids," *IEEE Trans. Smart Grid*, 2012 and C. Chen, S. Duan, T. Cai, B. Liu, and G. Hu, "Smart energy management system for optimal microgrid economic operation," *IET Renew. Power Gener.*, vol. 5, no. 3, p. 258, 2011. A two-tier control approach: global and local is described in Y. Wang, X. Lin, and M. Pedram, "Adaptive control for energy storage systems in households with photovoltaic modules," *IEEE Trans. Smart Grid*, 2014. The global tier determines the charge and discharge objective and the local tier minimizes the backfeed to the grid. A three level scheduling problems: day-ahead, intra-hour, and real-time is described in I. Lampropoulos, P. Garoufalis, P. P. van den Bosch, and W. L. Kling, "Hierarchical predictive control scheme for distributed energy storage integrated with residential demand and photovoltaic generation". This allows control decisions be made based on the market conditions in the day-ahead, real-time, and imbalance settlement markets in the Netherlands. Thus, the real-time controller can track the deviation from the day-ahead contract.

For residential applications, the main issue is to find when to charge and when to discharge—instead of the optimal charging and discharging power. Accordingly, what is needed, as recognized by the present inventors, is a method for controlling an energy storage system.

The foregoing "Background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention.

SUMMARY

The present disclosure relates to a method that determines, using processing circuitry, an operating schedule for the energy storage device based on at least an initial cost. The initial cost is a function of at least a load profile and a power production profile of at least one renewable energy source associated with the energy storage device. The operating schedule is established for a predetermined period. The method also determines an updated cost based on at least the operating schedule, identifies an operating mode from a plurality of operating modes for a predetermined operating period based on the updated cost and the operating schedule, and operates the energy storage device in the operating mode for the predetermined operating period.

The present disclosure also relates to an energy storage device that includes a controller. The controller is configured to determine an operating schedule for the energy storage device based on at least an initial cost. The initial cost is a function of at least a load profile and a power production profile of at least one renewable energy source associated with the energy storage device. The operating schedule is established for a predetermined period. The controller is configured to determine an updated cost based on at least the operating schedule, identify an operating mode from a plurality of operating modes for a predetermined operating period based on the updated cost and the operating schedule, and operate using the operating mode for the predetermined operating period.

The present disclosure also relates to a system that includes an energy storage device and a controller. The energy storage device is configured to operate in an operating mode indicated by a control signal received from a controller. The controller is configured to determine an operating schedule for the energy storage device based on at least an initial cost, the initial cost being a function of at least a load profile and a power production profile of at least one renewable energy source associated with the energy storage device and the operating schedule being established for a predetermined period, determine an updated cost based on at least the operating schedule, identify an operating mode from the plurality of operating modes for a predetermined operating period based on the updated cost and the operating schedule, and output a control signal to the energy storage device indicating the operating mode.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
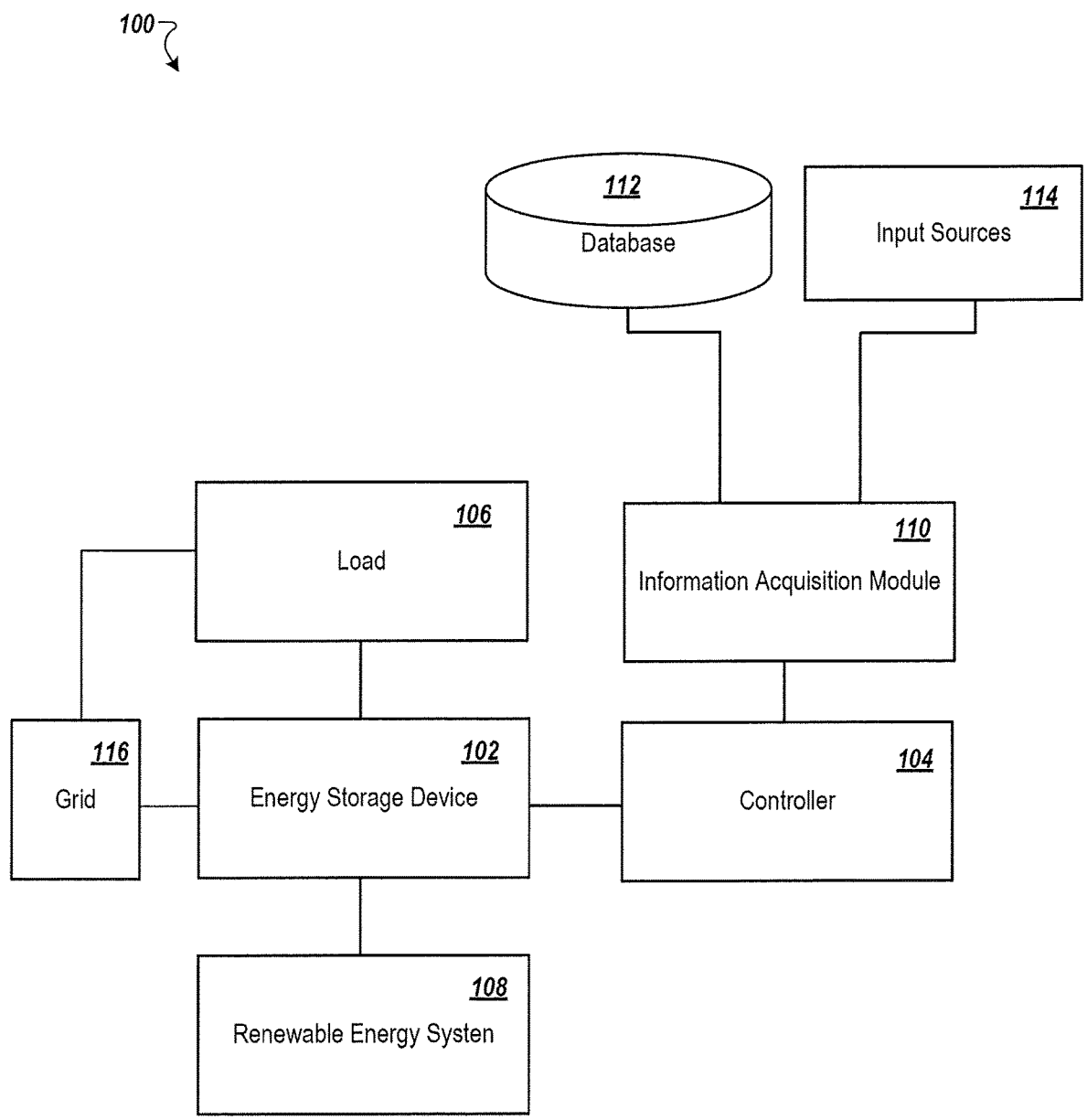
FIG. 1 is an exemplary diagram of a mode-based energy storage management system according to one example.

Referring now to the drawings, wherein like reference numerals designate identical or corresponding parts throughout several views, the following description relates to a system, a device, and associated methodology for controlling an energy storage system. Charge and discharge modes are identified so that an overall performance may be optimized in the presence of load forecasting errors. The method described herein may be used to control energy storage devices (ESDs).

FIG. 1 is an exemplary diagram of a mode-based energy storage management system 100. The system may include an energy storage device (ESD) 102. The ESD 102 stores renewable energy generated by a renewable generation system 108 such as solar photovoltaics (PVs). The renewable generation system 108 may include a wind power generation system (e.g., wind mills), a hydraulic energy source, a micro combined heat and power (CHP) unit for heating and electricity generation, or any other energy system from renewable resources such as rain, tides, or waves. The ESD 102 may be an electrical energy storage device, a fuel cell, a thermal energy storage device, a bioelectrochemical energy storage device, a hybrid energy storage device, or the like. The ESD 102 may also store energy supplied by a grid 116.

In one implementation, the ESD 102 may be a part of a home energy management system. The ESD 102 may be used to supply power to a load 106 when the cost of electricity is high and be recharged when the cost is low. The ESD 102 may be a part of a building energy management system at a commercial building, a residential building, or an industrial building. The grid 116 may supply energy to the load 106 when the cost of electricity is low.

In one implementation, the method described herein may be used in a power microgrid system that includes renewable energy sources and at least the ESD 102. Further, the microgrid system may be a hybrid microgrid that includes renewable energy sources, the ESD 102, and a second energy source such as a diesel/gas generator.

In one implementation, the method described herein may be applied in aggregated distributed energy resources systems that include electric battery storage in a commercial building, an industrial building, or a residential building or a home.

In one implementation, the ESD 102 may be a part of an aerospace structure such as a satellite, an aircraft, a spacecraft, and other space vehicles.

In one implementation, the ESD 102 may include a battery in an electric vehicle. In another example, the ESD 102 may be a large-capacity battery bank used in a data center or a smart grid.

The ESD 102 is controlled via a controller 104. The controller 104 may determine a real time mode of operation for the ESD 102 based on an operating schedule determined based on a forecasted load profile and renewable energy production information. The operating schedule is established for a predetermined period (e.g., 24 hours). The operating mode may be identified from a plurality of operating modes. The information may be obtained using an information acquisition module 110 that connects to a database 112 and/or input sources 114. The database 112 may store the operating schedule, forecast models, operating conditions associated with the plurality of operating modes or other information used by the controller 104 to determine an operating mode. The input sources 114 may include weather websites, energy supplier websites, or other sources that may have real-time weather data. The information acquisition module 110 may connect to the input sources 114 via a network. Suitable networks can include or interface with any one or more of a local intranet, a Personal Area Network (PAN), a Local Area Network (LAN), a Wide Area Network (WAN), a Metropolitan Area Network (MAN), a Virtual Private Network (VPN), or a storage area network (SAN).

The modules described herein may be implemented as either software and/or hardware modules and may be stored in any type of computer-readable medium or other computer storage device. For example, each of the modules described herein may be implemented in circuitry that is programmable (e.g., microprocessor-based circuits) or dedicated circuits such as application specific integrated circuits (ASICS) or field programmable gate arrays (FPGAS). In one embodiment, a central processing unit (CPU) could execute software to perform the functions attributable to each of the modules described herein. The CPU may execute software instructions written in a programming language such as Java, C, or assembly. One or more software instructions in the modules may be embedded in firmware, such as an erasable programmable read-only memory (EPROM).

In some implementations, the processes associated with each of the modules may be performed by one or more processors of the controller 104 or other computing resources, which can include cloud computing resources.

Figure 9:
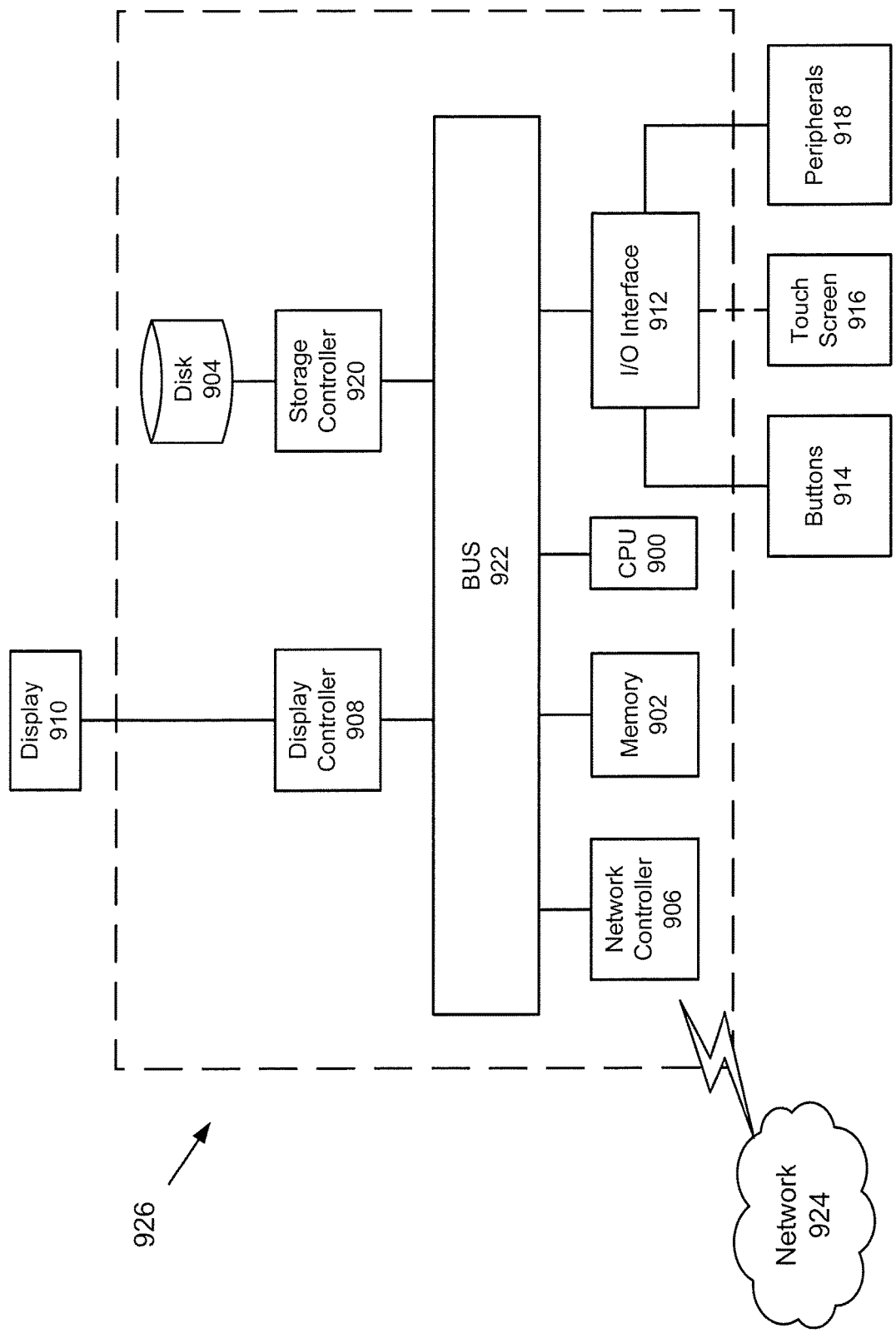
FIG. 9 is an exemplary block diagram of a computer according to one example.

For example, the processes may be performed by a computer 926 shown in FIG. 9. The computer 926 may include a CPU 900 and a memory 902 as shown in FIG. 9. The CPU 900 may execute software instructions written in a programming language such as Java, C, or assembly. In one implementation, the database 112 may be implemented in the memory 902 of the computer 926. In one implementation, the computer 926 may control a plurality of energy storage devices. The plurality of energy storage devices may be associated with a single entity (e.g., a home) or a plurality of entities (e.g., a community). For example, the computer 926 may identify an operating schedule and operating modes for each of the plurality of entities based on one renewable energy forecast when the entities are located in a geographical area that has common weather data.

Figure 2:
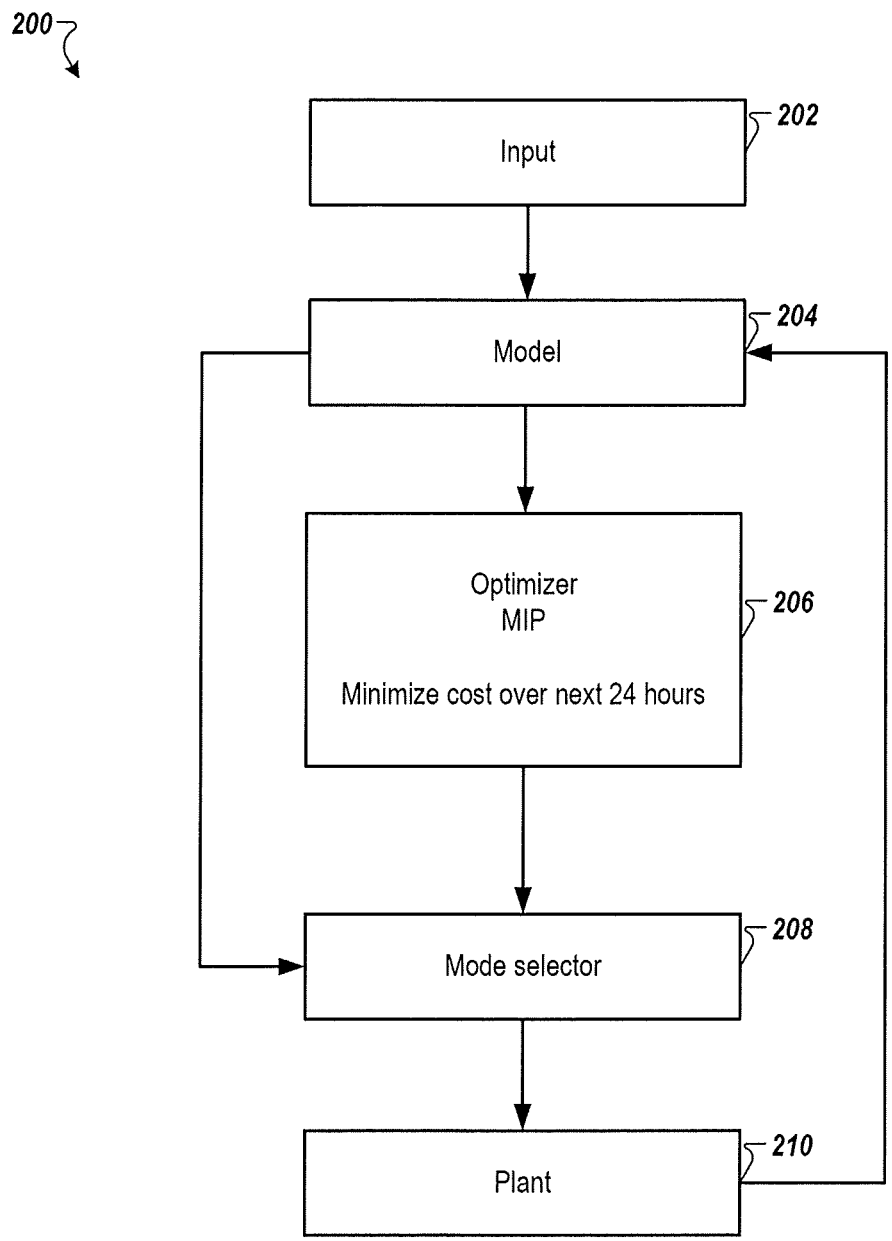
FIG. 2 is a flowchart that shows a model-predictive control (MPC) process for minimizing an impact of forecasting errors according to one example.

FIG. 2 is a schematic that shows a MPC process 200 for minimizing an impact of forecasting errors according to one example. Input 202 is fed to a model 204. The input 202 may include load forecast data, PV or other energy source forecast data, and price forecast data for a predetermined period (e.g., 24 hours). The input 202 may also include other factors. The model 204 may determine a load forecast, a PV forecast, and a price forecast. An optimizer 206 (e.g., mixed integer programming (MIP)) minimizes cost over the predetermined period (e.g., 24 hours). A mode selector 208 may identify a mode of operation based on the output from the optimizer 208 and the model 204 as described further below. The identified mode is output to the plant 210 (e.g., ESD 102). Outputs (e.g., measurements) from the plant 210 are fed back to the model 204.

In one implementation, the controller 104 is used for controlling the charging and discharging of the ESD (e.g., a battery) for residential PV applications with a control objective to minimize an electricity bill based on time-of-use (TOU) rates. The main grid may supply the loads when the house does not consume self-generated PV power. Residential TOU rates from California (i.e., net energy metering) and Hawaii (no valorization of excess generation) are used for comparing the algorithm performance under different rate structures.

In one implementation, nine real-time operations modes are used: 4 charging modes, 4 discharging modes, and 1 idling mode, as shown in Table 1. Although including more built-in control modes means more flexibility in control, it also increases the complexity of controller 104 design. The advantages of using predetermined operation modes instead of a customized response are threefold: achieve higher efficiency and longer battery operation time, allow for plug-and-play, and easy for standardization. An ESD manufacturer can predefine and implement a set of standard operation modes and fine tune the ESD performances based on which mode it can be operated. This can lead to standardization of a control interface design and optimization of the performance of the ESD for each operation mode. The ESD 102 may be a plug-and-play device, and the controller 104 can select an operation mode for achieving different control objectives. Note that the modes are usually based on the application but not based on control objective, which means one can use the given set of modes to implement a variety of control objectives. As shown in Table 2, the power output calculation of the battery system is different in each mode.

TABLE 1

Operation modes of the ESD controller

| Charge | 1 | Charge following PV generation |
|---|---|---|
|  | 2 | Charge following PV generation with a charging limit |
|  | 3 | Charge from the grid at maximum power |
|  | 4 | Charge from the grid with a charge limit |
| Discharge | 1 | Discharge following load profile |
|  | 2 | Discharge following load profile with a discharge limit |
|  | 3 | Discharge at maximum power |
|  | 4 | Discharge at maximum power with a discharge limit |
| Idle |  | Idle |

TABLE 2

Calculation of the battery power output at each operation mode

| Charge | 1 | $P_i = \max(0, \min(P_{sol} - P_{load}, SOC_{max} - SOC))$ |
|---|---|---|
|  | 2 | $P_i = \max(0, \min(P_{sol} - P_{load}, SOC_{max} - SOC, ChargeLimit))$ |
|  | 3 | $P_i = \min(P_{rated}, SOC_{max} - SOC)$ |
|  | 4 | $P_i = \min(P_{rated}, SOC_{max} - SOC, ChargeLimit)$ |

TABLE 2-continued

Calculation of the battery power output at each operation mode

| Discharge | 1 | $P_i = \max(0, \min(P_{load} - P_{sol}, P_{rated}, SOC - SOC_{min}))$ |
|---|---|---|
|  | 2 | $P_i = \max(0, \min(P_{load} - P_{sol}, P_{rated}, SOC - SOC_{min}, DischargeLimit))$ |
|  | 3 | $P_i = \min(P_{rated}, SOC - SOC_{min})$ |
|  | 4 | $P_i = \min(P_{rated}, SOC - SOC_{min}, DischargeLimit)$ |
| Idle |  | $P_i = 0$ |

Define $u_i$ as the ESD operation state (−1/0/+1 associated with the discharging/idling/charging) and $P_i$ as the output power at the $i^{th}$ time interval. Then, the SOC at the i+1 time interval can be calculated by the controller 104 as:

$$SOC_{i+1} = SOC_i - \frac{u_i P_i}{P_{rated}} \Delta t \qquad (1)$$

$$0 < P_i \leq P_{rated} \quad u_i \in \{-1, 0, 1\}$$

$$SOC_{min} \leq SOC \leq SOC_{max}$$

Table 2 describes the mathematical formulation of each mode. $P_i$ represents charge or discharge power (output power). $P_{sol}$ is the output of the solar panels (output of the renewable energy system 108), $P_{load}$ is the household load, SOC is the current state of charge of the battery, $SOC_{max}$ is the maximum state of charge of the battery, $SOC_{min}$ the minimum state of charge. $P_{rated}$ is the maximum power of the energy storage. DischargeLimit and ChargeLimit are the limits that can be imposed by the modes that include limits. For example, Mode 1 of charging may limit the charging at the excess of solar of availability of charging capacity in the ESD 102. $SOC_{max}$ ¬ SOC is the capacity that can be charged while SOC ¬ $SOC_{min}$ is the capacity that can be discharged.

Figure 3:
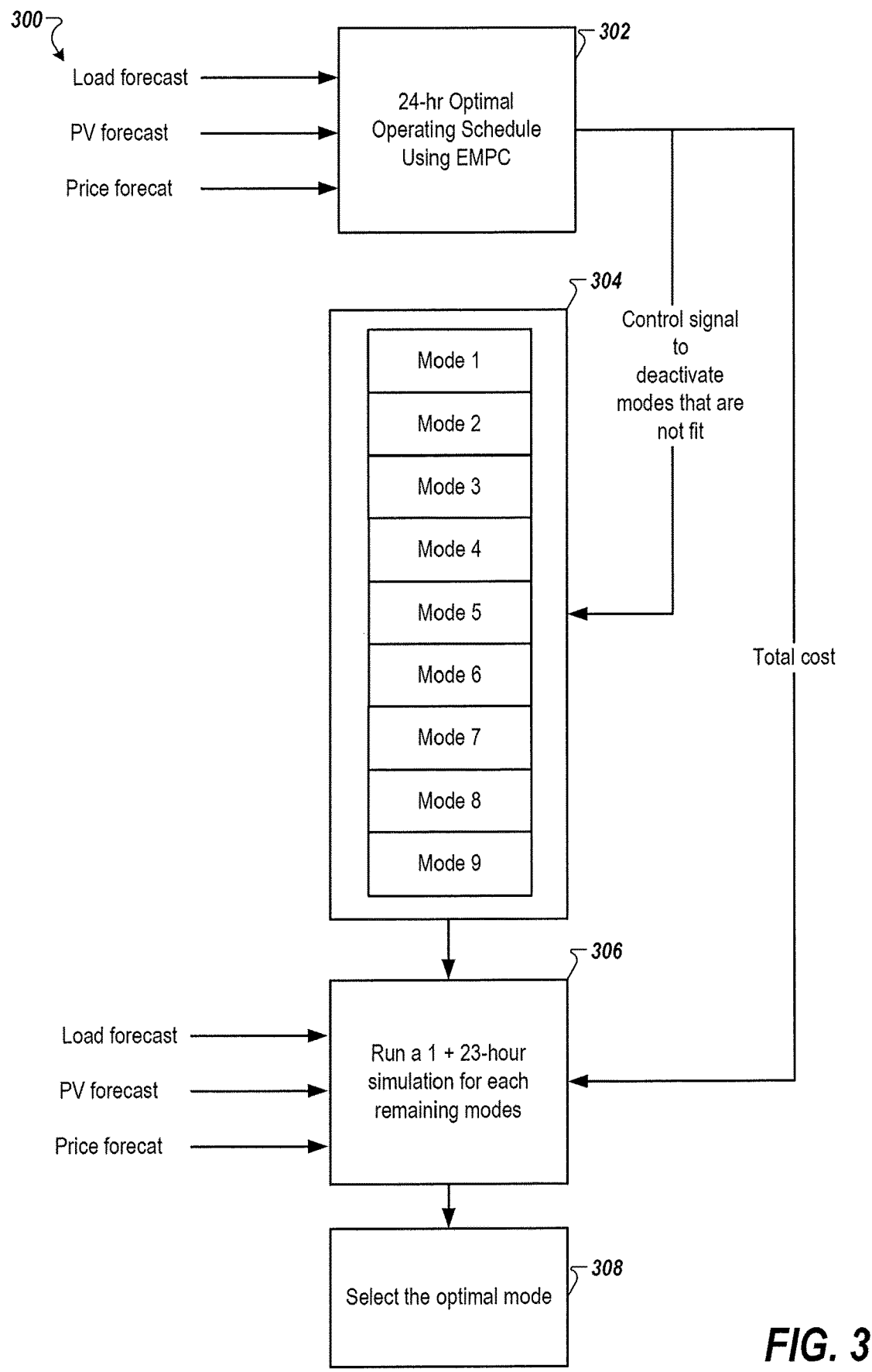
FIG. 3 is a flowchart that shows a mode selecting process according to one example.

FIG. 3 is a flowchart 300 that shows a mode selecting process according to one example. In one implementation, the EMPC controller is a Mixed Integer Programming (MIP) based scheduling algorithm. In a first stage 302, a 24-hour schedule is determined (e.g., by the controller 104) based on the 24-hour ahead forecast of PV, load, and electricity price. The 24 hour schedule reflects the charging and discharging power of the ESD 102 for optimizing the energy bill for the predetermined period (e.g., next 24-hour period) without considering the feasibility of the ESD control actions. Then, control modes that are unfit are eliminated based on the required actions that the ESD 102 is identified to take for the next hour or other period. For example, if the EMPC results show that for the next hour, the battery should charge at 2 kW, then all the discharging modes are eliminated and all the charging modes are selected for the next stage comparison (304). Note that although in this case, an EMPC based approach is used to minimize the bill for the user over the 24-hour period, other methods may be implemented for obtaining the operational trends. At the end of each first stage, the total cost for the next scheduling horizon and the optimal ESD output for the next time step are obtained by the controller 104. The feasible modes are also obtained (Table 3).

TABLE 3

Modified control actions

| First optimization | External conditions | Modified control |
|---|---|---|
| $P_{charge} > 0$ | $P_{sol} - P_{load} > 0$ | Charge mode 1 |
| $P_{discharge} = 0$ | $P_{sol} < P_{load}$ | Charge mode 3 |
| $P_{charge} = 0$ | $P_{discharge} < P_{load} - P_{sol}$ | Discharge mode 5 |
| $P_{discharge} > 0$ | $P_{discharge} > P_{load} - P_{sol}$ | Discharge mode 7 |
| $P_{charge} = 0, P_{discharge} = 0$ | | Idle |

The inputs of a second stage 306 include: the feasible mode, the forecasted data, the total cost for the next day, and the control actions for the next hour. First, the cost for the next hour along with the SOC at the end of the next time step is calculated, by the controller 104, for each feasible mode. Then, for each feasible mode, an optimization is run starting at the end of the next time step. The horizon of the optimization is reduced by one time step by the controller 104 (e.g., by one hour). The optimization may start after the next time step with the newly calculated SOC. Then, the result of the optimization is summed with the cost of the next hour. The total cost for the next day for each feasible mode is determined by the controller 104 as described later herein. The mode with the least cost is selected (308). If the total cost found in the first stage is lower, a charging or discharging limit may be applied. The limit corresponds to the ESD output found in the first stage (302).

Figure 4:
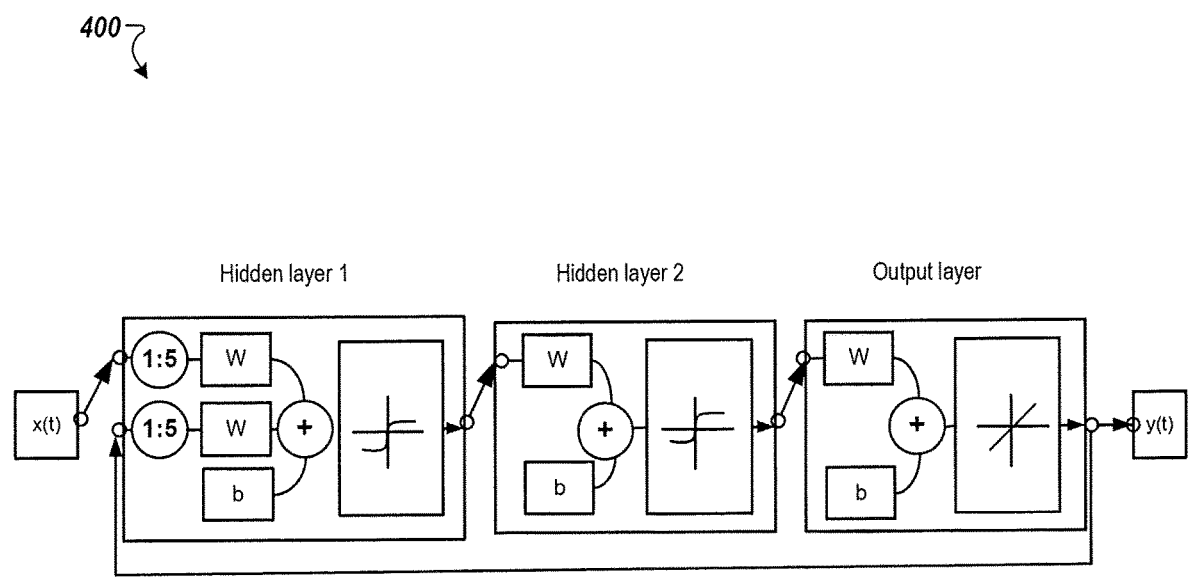
FIG. 4 is a block diagram that shows a neural network forecaster architecture according to one example.

Because residential loads variations are highly volatile, an accurate forecast is difficult to achieve. Therefore, it is important to assess how the optimality of the method described herein is affected. To compare the robustness of the algorithm with respect to the accuracy of the load forecast, three cases are considered: a perfect load forecast, a neural network forecaster, and the average load as the load forecast. Therefore, in the first case, actual loads assuming zero forecasting error are used. In the second case, a neural network forecaster that consists of a Narnet with 25 neurons in the first layer and 10 in the second is used. In one implementation, the neural network forecaster may be that disclosed in H. T. Yang, J. T. Liao, and C. I. Lin, "A load forecasting method for HEMS applications," 2013 *IEEE Grenoble Conf. PowerTech, POWERTECH* 2013, pp. 1-6, 2013 incorporated herein by reference in its entirety. Other neural network forecasters having different numbers of neurons and/or number of layers may be used as understood by one of ordinary skill in the art. As shown in FIG. 4, a Narnet is a nonlinear autoregressive neural network 400. In one implementation, the Matlab Neural Network toolbox may be used to create, train, and use the neural network.

Training data includes temperature, temporal data (e.g., weekday, hours, month), and historical load data. The forecaster has a 5% forecast error on OpenEI data and 50% error on the Pecan Street data. To obtain this comparison, each forecaster is trained with 6 months of data. The forecaster is initially trained with 3 months of historical data. Then, at the beginning of each month, the data from all previous months are used to retrain the model.

In the third case, a load forecaster that forecasts the average load for the whole day is used such that an expected load to solar output ratio is obtained for determining whether the energy storage should charge or discharge.

Figure 5:
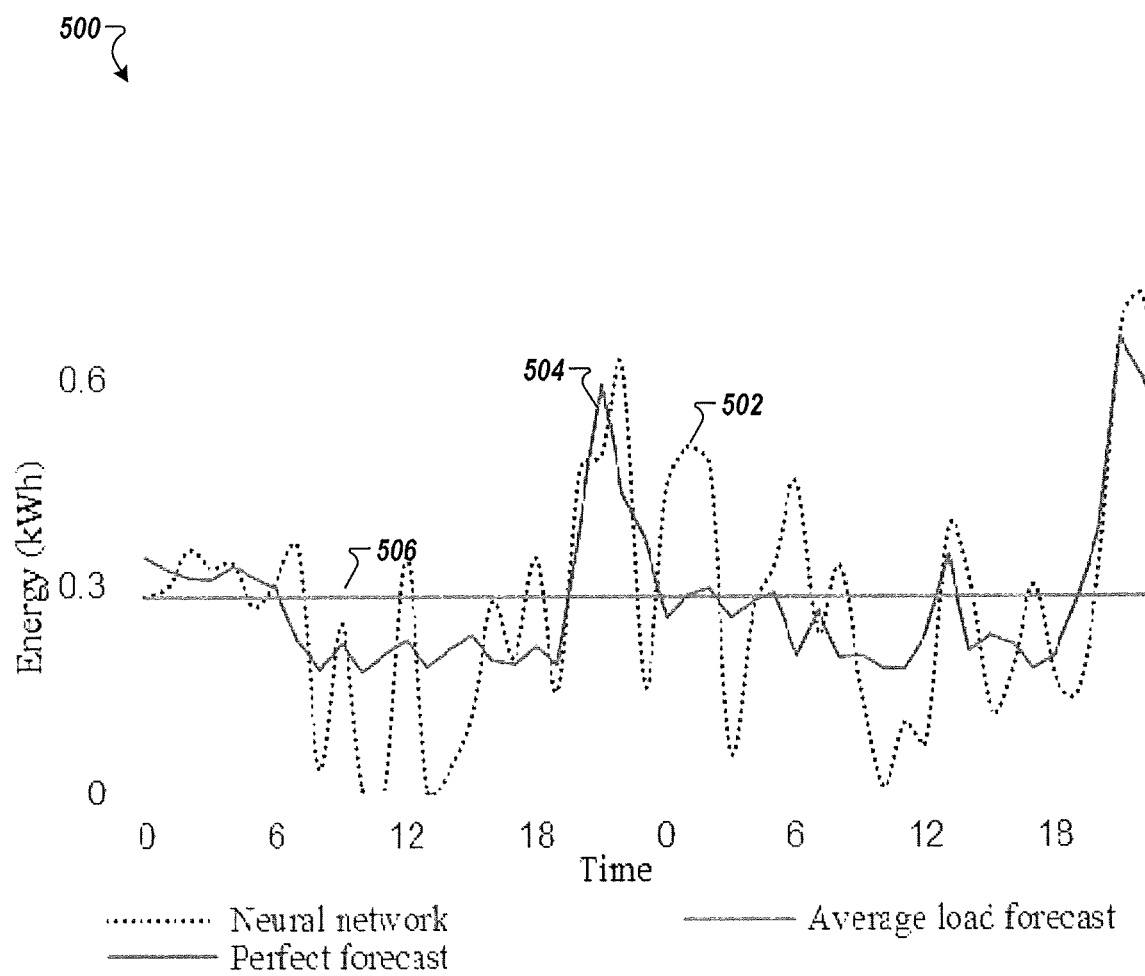
FIG. 5 is a schematic that shows outputs of thread load forecast methods according to one example.

FIG. 5 is a graph 500 that shows outputs of the three load forecast methods according to one example. Trace 502 shows a forecast load obtained using neural network 400 over 48 hours. Trace 504 shows a perfect forecast over the 48 hours. Trace 506 shows an average load forecast over the 48 hours period.

The objective function of an EMPC problem formulation minimizes the sum of the hourly cost of electricity for the next time horizon considering buying, selling, and the equivalent cost of battery depreciation considering the following operational constraints:

$$\min J = \Sigma C_{import}(t) \times P_{import}(t) + C_{export}(t) \times P_{export}(t) + B_{cycle}(t) \times C_{cycles}(t) \quad (2)$$

subject to $$SOC_{min} \leq SOC(t) \leq SOC_{max} \quad (3)$$

$$SOC(t) = SOC(t-1) + P_{charge}(t) \times \eta - \frac{P_{discharge}(t)}{\eta} \quad (4)$$

$$0 \leq P_{charge}(t) \leq bin1(t) * P_{charge}^{max} \quad (5)$$

$$0 \leq P_{discharge}(t) \leq (1 - bin1(t)) * P_{discharge}^{max} \quad (6)$$

$$0 \leq P_{import}(t) \leq bin2(t) * P_{charge}^{max} \quad (7)$$

$$0 \leq P_{export}(t) \leq (1 - bin2(t)) * P_{discharge}^{max} \quad (8)$$

$$P_{import}(t) - P_{export}(t) - P_{charge}(t) + P_{discharge}(t) = P_{load}(t) - P_{solar}(t) \quad (9)$$

where $P_{import}$, $P_{export}$, $B_{cycles}$, $P_{charge}$, $P_{discharge}$, SOC≥0

$t \in [0, \ldots, \text{horizon}]$, bin1, bin2∈[0,1]

$P_{charge}$ is the charging power in kW, $P_{discharge}$ is the discharging power in kW, $P_{import}$ is the power supplied by the grid in kW, $P_{export}$ is the power backfed to the grid in kW, $B_{cycles}$ is the number of cycles, $SOC_{min}$ is the minimum battery SOC in kWh, $SOC_{max}$ is the maximum battery SOC in kWh, SOC is the current state of charge of the battery in kWh, $P_{charge}^{max}$ is the maximum charging power of the battery in kW, $P_{discharge}^{max}$ is the maximum discharging power of the battery in kW, $P_{import}^{max}$ is the maximum power that can be imported in kW, $P_{export}^{max}$ is the maximum power that can be exported in kW, $P_{load}$ is the load consumption in kW, $P_{solar}$ is solar (or other renewable) generation in kWh, $C_{import}$ is the price to purchase electricity from the grid $/kWh, $C_{export}$ is the price to sell electricity to the grid $/kWh, $C_{cycles}$ is the cost of the depreciation of 1 cycle of the battery $/cycle, η is the battery efficiency, one-way in %, bin1 is a binary variable used to prevent from charging and discharging at the same time, bin2 is a binary variable used to prevent from importing and exporting at the same time.

In one implementation, the number of battery cycles is calculated by the controller 104:

$$B_{cycles}(t) = \frac{P_{charge}(t) + P_{discharge}(t)}{2 \times \text{capacity}} \quad (10)$$

Other calculation methods for battery cycling estimation can also be applied as would be understood by one of ordinary skill in the art.

To determine the optimal mode for the next time step, Equation (2) is solved, by the controller 104 of the ESD 102 to optimize the 24-hour ahead battery schedule to find the total bill and the control operation for the next time step. Based on the control actions for the next time step, the infeasible control modes are eliminated. A second round optimization may be conducted so that the optimal mode for the next time step is found as described previously herein.

Figure 6:
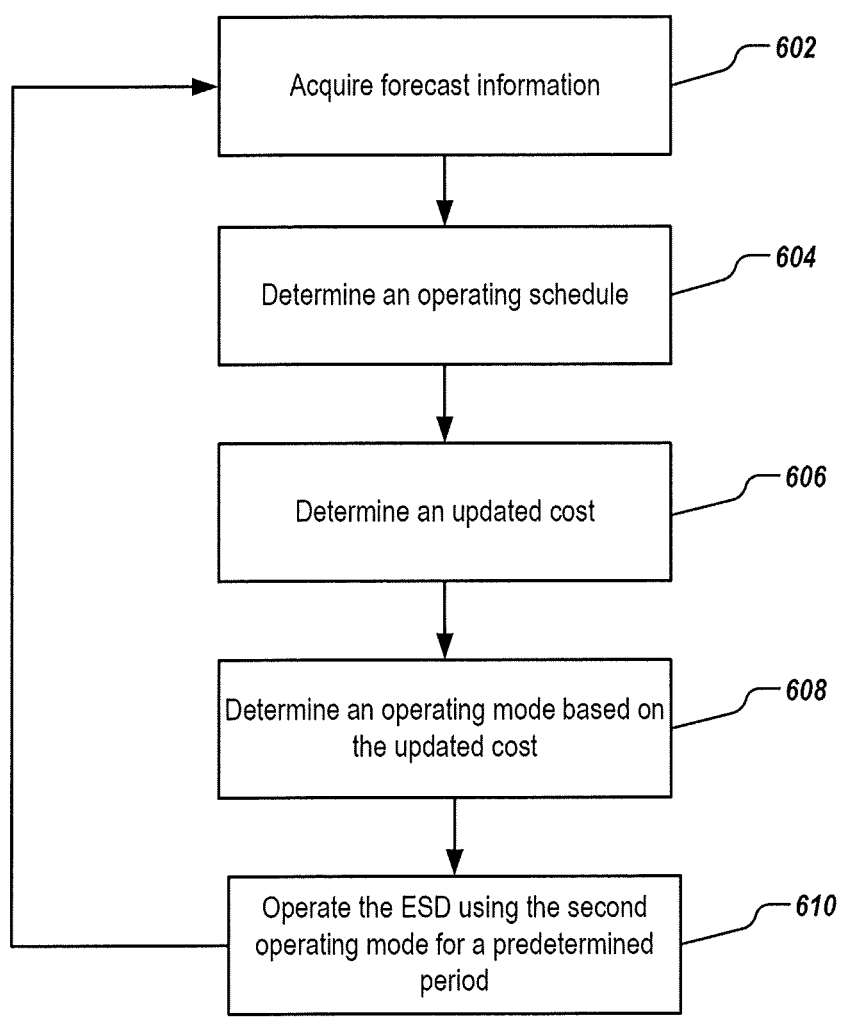
FIG. 6 is a flowchart for a method for operating an energy storage device (ESD) according to one example.

FIG. 6 is a flowchart for a method 600 for an ESD operation according to one example. At step 602, the controller 104 may acquire forecast information as described previously herein. For example, the controller 104 may acquire weather data from input sources 114.

At step 604, the controller 104 may determine an operating schedule including a first operating mode based on an initial cost. The initial cost may be a function of a load forecast, a PV or other energy source forecast data, a price forecast including price to sell and to purchase electricity, and the cost of the depreciation of the battery. For example, one of the five modes shown in Table 3 may be selected. At step 606, an updated cost is calculated for the remaining period of the predetermined period. The updated cost may be a function of the load profile, the PV or other energy source forecast data, the price forecast, the cost of the depreciation of the battery, the initial cost, and the updated battery information (e.g., SOC) at the end of the operating period. For example, the cost for the 23 hours is calculated when the predetermined period is 24 hours and each operating period is one hour.

At step 608, a second operating mode is identified, by the controller 104, based on the updated cost. In one implementation, the controller 104 may determine whether a charging or discharging limit may be needed to be implemented in order to obtain the minimal cost. A limit is implemented when the cost from the first stage (e.g., step 604) is lower than the updated cost. The charging or discharging is limited to the ESD output of the first stage (e.g., step 604). In one implementation, the charging or discharging may be limited to a value as a function of the ESD output (e.g., a predetermined percentage of the ESD output).

At step 610, the ESD 102 is operated using the second operating mode for a predetermined period (e.g., 1 hour).

Steps 606, 608, and 610 are repeated after the predetermined period (e.g., 1 hour).

In one implementation, the amount of power that has been charged or discharged is updated based on real data and the process goes back to step 602.

Although the flowcharts show specific orders of executing functional logic blocks, the order of executing the block blocks may be changed relative to the order shown, as will be understood by one of ordinary skill in the art. Also, two or more blocks shown in succession may be executed concurrently or with partial concurrence.

To illustrate the capabilities of the controller 104 and associated methodologies described herein, exemplary results are presented.

Two types of TOU rates are studied: California San Diego with Net Energy Metering and Hawaii with no valorization of backfeed. The load and PV generation data are obtained from the Pecan Street project website.

The residential household electricity consumption data set collected by the Pecan Street project is used. As shown in Table 3, 10 houses across three states were selected with yearly energy consumption varying from 2.3 to 21.77 MWh. Among the ten households, eight are equipped with rooftop PV systems. Each simulation run is 1 year. At the beginning of the simulation, the previous 3 months of data is used to train the forecaster. Then, the method described herein is applied for 9 months to obtain the results. Pecan Street meter data contains both the load and PV data. The PV size varies from house to house.

TABLE 4

A summary of the load data

| House ID | Location | Total load (MWh) | Ratio PV/load |
|---|---|---|---|
| 9836 | San Diego, CA | 3.15 | 1.11 |
| 9737 | Austin, TX | 21.77 | 0.59 |
| 5938 | San Diego, CA | 2.3 | 0 |
| 4830 | Boulder, CO | 8.94 | 0.63 |
| 4703 | Boulder, CO | 6.15 | 0.56 |
| 3092 | Grand Prairie, TX | 14.79 | 0.20 |
| 2606 | San Diego, CA | 5.92 | 0 |
| 2018 | Austin, TX | 20.89 | 0.49 |
| 1879 | Boulder, CO | 9.8 | 0.19 |
| 624 | Austin, TX | 5.97 | 1.02 |

Two TOU rates are used. The first one is the net metering TOU used in California. Net energy metering (NEM) allows for backfeed, compensated at the same price as the retail rate, in the limit of the energy imported. The second one is the TOU rate used in Hawaii designed to motivate self-consumption case. In the Hawaii case, no backfeed is allowed. Tariffs details are presented in Table 5.

TABLE 5

Electricity tariff data

| | Price (c$) | Hour weekday | Hour weekend |
|---|---|---|---|
| | | California (Summer) | |
| Off peak | 20.71 | 10 PM-6 AM | All day |
| Shoulder | 22.9 | Hours in between | — |
| Peak | 46.97 | 11 AM-6 PM | — |
| | | California (Winter) | |
| Off peak | 20.38 | 6 PM-6 AM | All day |
| Shoulder | 21.72 | 6 AM-6 PM | — |
| | | Hawaii | |
| Off peak | 18.21 | 9 PM-7 AM | 9 PM-5 AM |
| Shoulder | 23.71 | 7 AM-5 PM | 5 PM-9 PM |
| Peak | 26.71 | 5 PM-9 PM | — |

Seven scenarios are studied (shown in Table 6) to compare the performance of the proposed mode-based algorithm with MIP-only algorithm when different forecasters are used. Regarding the battery, the same size for every house is considered. The capacity is 7 kWh with and the rated power is 3 kW for charging and discharging. Round trip efficiency is 90%.

TABLE 6

Scenario setting of the case studies

| | |
|---|---|
| Case 1 | Base case with no battery installed |
| Case 2 | MIP-only optimization with a perfect forecaster |
| Case 3 | MIP-only optimization with a neural network base forecaster |
| Case 4 | MIP-only optimization with an average load forecaster |
| Case 5 | Perfect forecast + mode-based control |
| Case 6 | Neural Networks + mode-based control |
| Case 7 | Constant average load forecast + mode-based control |

Figure 7:
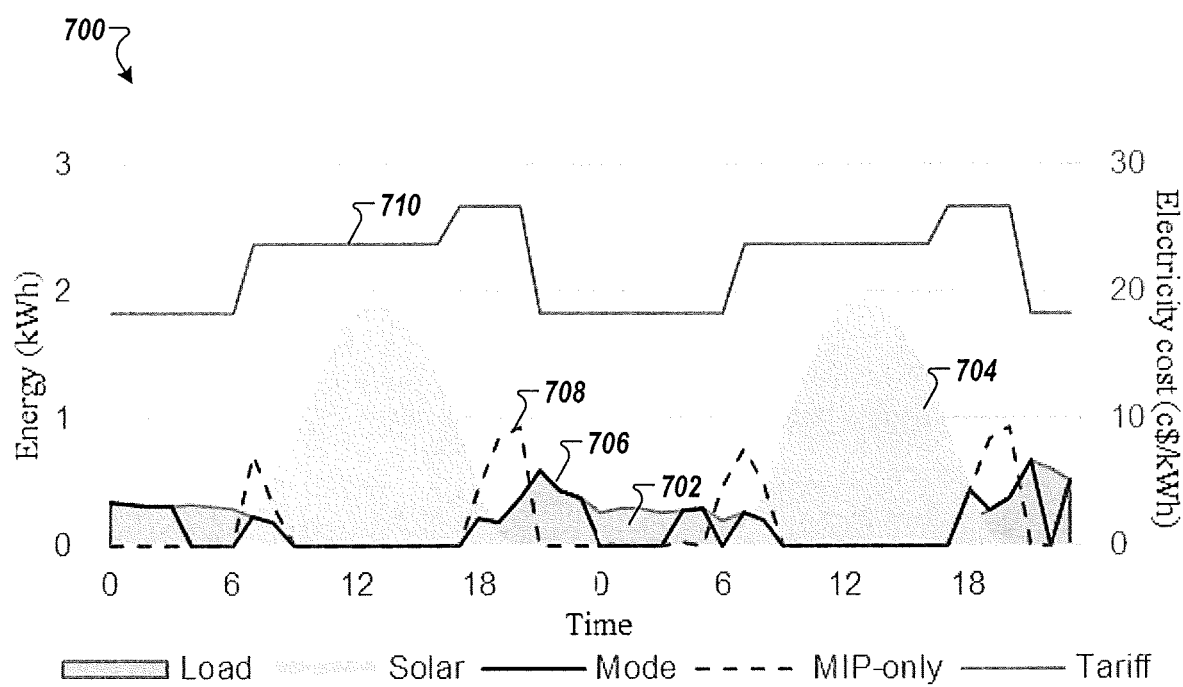
FIG. 7 is a schematic that shows exemplary results.

As an illustration, the simulation results for House 9836, located in San Diego, California are shown in Table 7 and FIG. 7. As shown in Table 7, cases 2 and 5 have very similar performance showing that the mode-based scheduling approach can perform equally well as the MIP optimization and perfect forecast. If using Hawaiian rates, the mode-based approach outperforms the MIP-based approach using non-perfect forecasters.

TABLE 7

Yearly electricity cost for house 9836 in $.

|    | Case 1 | Case 2 | Case 3 | Case 4 | Case 5 | Case 6 | Case 7 |
|----|--------|--------|--------|--------|--------|--------|--------|
| HW | 440.14 | 124.6  | 386.9  | 215.9  | 123.83 | 331.58 | 148.5  |
| CA | 506.66 | −3.18  | −3.18  | −3.18  | −3.18  | −3.18  | −3.18  |

In the Californian case, cases 2 to 7 have similar performances. This is because the charging and discharging decisions are based on the rates and different prices. There is a perfect knowledge of the distribution of the rates during the day. Therefore, all the algorithms have similar performances.

In the schematic 700 of FIG. 7, the load is indicated by surface 702 and the solar by surface 704. The continuous line 706 is the discharge based on the mode selection and the dotted line 708 is the discharge based on the MIP-only results. Line 710 shows the electricity price at a given moment. FIG. 7 shows that if the MIP-only control actions are followed, the battery may sometimes over-discharge or under-discharge due to the inaccuracy of the forecaster. Whereas due to the nature of the mode control, with no fixed value objective, the discharge has a closer match to the shape of the load.

The mode-based algorithm described herein is more robust to forecast inaccuracies as demonstrated by the equal performance with a perfect forecast, and better results with non-perfect forecasted as shown in Table 7 and FIG. 7.

The same algorithm has been used for both rates. The export and import costs are updated in the objective problem in order to use the algorithm and methodology described herein in another location based on a rate type. The battery parameters can be modified based on battery providers.

Next, simulation results for multiple-houses are described. The simulation results in FIG. 8 and Table 8 are for 10 households using the Hawaiian rate.

Figure 8:
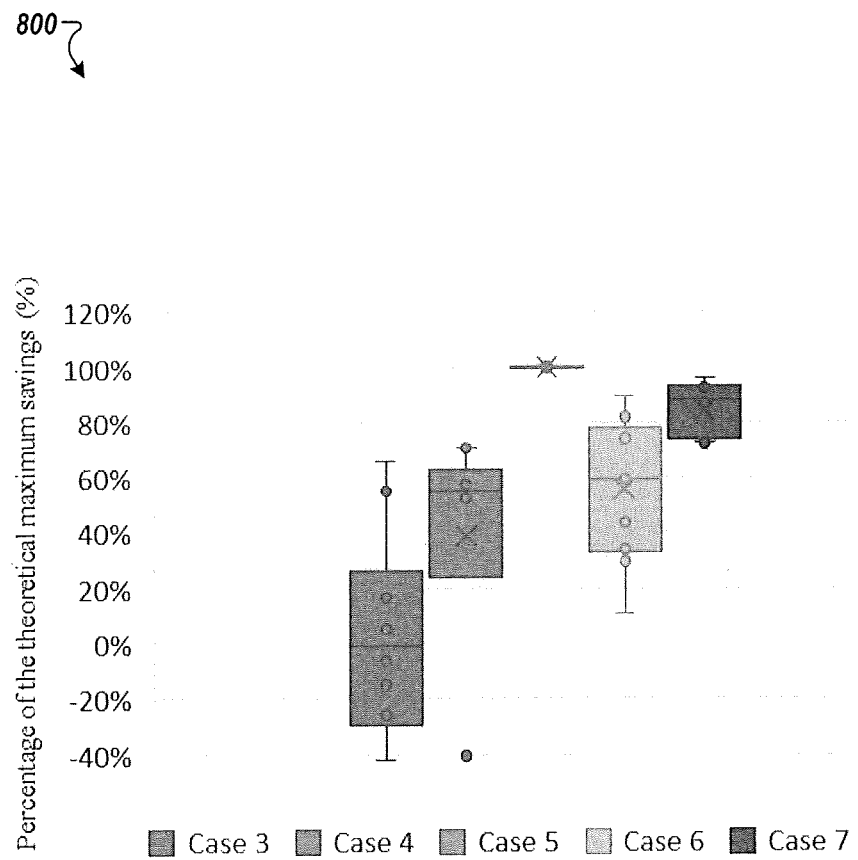
FIG. 8 is a schematic that shows exemplary maximum achieved savings according to one example.

In Table 8, the total cost for each case and each house over one year using the Hawaiian tariff is shown. In FIG. 8 the distribution of the percentage of potential savings achieved for each house is shown. The maximum potential savings are calculated with the difference between the base case, case 1, and the MIP-only scenario and perfect forecast, case 2.

TABLE 8

Hawaii results for 10 selected houses in $.

| House ID | Case 1 | Case 2 | Case 3 | Case 4 | Case 5 | Case 6 | Case 7 |
|----------|--------|--------|--------|--------|--------|--------|--------|
| 9836 | 440.1  | 124.6  | 386.9  | 215.9  | 123.8  | 331.6  | 148.5  |
| 9737 | 3290.2 | 2772.3 | 2948.6 | 2978.6 | 2772.2 | 2826.8 | 2904.3 |
| 5938 | 485.4  | 453.9  | 890.1  | 498.2  | 453.9  | 466.7  | 455.6  |
| 4830 | 1529.9 | 1103.5 | 1709.6 | 1279.2 | 1103.8 | 1484.2 | 1158.5 |
| 4703 | 990.7  | 651.5  | 972.6  | 749.9  | 651.1  | 789.0  | 664.3  |
| 3092 | 2733.5 | 2528.3 | 2785.8 | 2641.3 | 2528.3 | 2672.5 | 2580.9 |
| 2606 | 1286.2 | 1210.0 | 1281.0 | 1316.2 | 1210.0 | 1227.8 | 1231.0 |
| 2018 | 3131.5 | 2644.6 | 2861.9 | 2874.3 | 2644.6 | 2731.8 | 2778.6 |
| 1879 | 1931.7 | 1738.3 | 1943.5 | 1828.8 | 1738.3 | 1788.1 | 1757.6 |
| 624  | 797.9  | 380.6  | 859.3  | 556.3  | 376.9  | 615.1  | 423.2  |

FIG. 8 is a schematic 800 that shows the percentage of maximum saving achieved. In FIG. 8, the y-axis represents the percentage of the theoretical maximum savings achievable. The maximum savings are obtained by using a MIP-only algorithm combined with a perfect forecaster. The box plots are obtained by calculating the percentage of this value obtained by the other cases for each house. The distribution of these values for each case is calculated.

From FIG. 8, it can be observed that the mode scheduling based algorithm always achieved close to 100% of the potential saving calculated in the case 5, optimization+perfect forecast. The case combining mode scheduling and average load forecast gets results comprised between 75% and 95%. Houses 9836 and 624 that have the most PV got results greater than 90%. It can also be observed that on average the mode-based scheduling performance are greater than in the case of EMPC only. The mode-based control may be less sensible to the forecast accuracy.

The impact of the forecaster on the results can be observed as well. For the EMPC algorithm, the importance of the precision is tremendous. Due to the volatility of the load, using a Neural Network forecaster can lead to a bill greater than with no storage. However, this impact is reduced using the average load forecast. The mode-based control has results that are more consistent across the forecasters.

In one implementation, the functions and processes of the controller 104 may be implemented by a computer 926. Next, a hardware description of the computer 926 according to exemplary embodiments is described with reference to FIG. 9. In FIG. 9, the computer 926 includes a CPU 900 which performs the processes described herein. The process data and instructions may be stored in memory 902. These processes and instructions may also be stored on a storage medium disk 904 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer 926 communicates, such as a server or computer.

Further, the claimed advancements may be provided as a utility application, background daemon, or component of an operating system, or combination thereof, executing in conjunction with CPU 900 and an operating system such as Microsoft® Windows®, UNIX®, Oracle® Solaris, LINUX®, Apple macOS® and other systems known to those skilled in the art.

In order to achieve the computer 926, the hardware elements may be realized by various circuitry elements, known to those skilled in the art. For example, CPU 900 may be a Xenon® or Core® processor from Intel Corporation of America or an Opteron® processor from AMD of America, or may be other processor types that would be recognized by one of ordinary skill in the art. Alternatively, the CPU 900 may be implemented on an FPGA, ASIC, PLD or using discrete logic circuits, as one of ordinary skill in the art would recognize. Further, CPU 900 may be implemented as multiple processors cooperatively working in parallel to perform the instructions of the inventive processes described above.

The computer 926 in FIG. 9 also includes a network controller 906, such as an Intel Ethernet PRO network interface card from Intel Corporation of America, for interfacing with network 924. As can be appreciated, the network 924 can be a public network, such as the Internet, or a private network such as LAN or WAN network, or any combination thereof and can also include PSTN or ISDN sub-networks. The network 924 can also be wired, such as an Ethernet network, or can be wireless such as a cellular network including EDGE, 3G and 4G wireless cellular systems. The wireless network can also be WiFi®, Bluetooth®, or any other wireless form of communication that is known.

The computer 926 further includes a display controller 908, such as a NVIDIA® GeForce® GTX or Quadro® graphics adaptor from NVIDIA Corporation of America for interfacing with display 910, such as a Hewlett Packard® HPL2445w LCD monitor. A general purpose I/O interface 912 interfaces with a keyboard and/or mouse 914 as well as an optional touch screen panel 916 on or separate from display 910. General purpose I/O interface also connects to a variety of peripherals 918 including printers and scanners, such as an OfficeJet® or DeskJet® from Hewlett Packard®.

The general purpose storage controller 920 connects the storage medium disk 904 with communication bus 922, which may be an ISA, EISA, VESA, PCI, or similar, for interconnecting all of the components of the computer 926. A description of the general features and functionality of the display 910, keyboard and/or mouse 914, as well as the display controller 908, storage controller 920, network controller 906, and general purpose I/O interface 912 is omitted herein for brevity as these features are known.

The features of the present disclosure provide a multitude of improvements in the technical field of battery management. In particular, the controller identifies an operation mode for the ESD for the next predetermined period based on a schedule and periodical adjustments. The methodology described herein could not be implemented by a human due to the sheer complexity of data, gathering and calculating and includes a variety of novel features and elements that result is significantly more than an abstract idea. The mode-based control is more robust to inaccuracies. The method described herein may be used with different forecasters (e.g., average load forecast, neural network based forecaster). The ESD may be standardized. Further, the safety and efficiency of the ESD is improved as the operation conditions of each mode can be predefined. Thus, the implementations described herein improve the functionality of the ESD. Thus, the system and associated methodology described herein amount to significantly more than an abstract idea based on the improvements and advantages described herein.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The above disclosure also encompasses the embodiments listed below.

(1) An energy storage device includes a controller. The controller is configured to determine an operating schedule for the energy storage device based on at least an initial cost, the initial cost being a function of at least a load profile and a power production profile of at least one renewable energy source associated with the energy storage device and the operating schedule being established for a predetermined period; determine an updated cost based on at least the operating schedule; identify an operating mode from a plurality of operating modes for a predetermined operating period based on the updated cost and the operating schedule; and operate the energy storage device in the operating mode for the predetermined operating period.

(2) The device of feature (1), in which the operating schedule includes a subset of feasible modes identified from the plurality of operating modes.

(3) The device of features (1) or (2), in which the plurality of operating modes include a charge mode from energy generated from the at least one renewable energy source, another charge mode from energy generated from an energy grid, a discharge mode at a maximum power, another discharge mode following the load profile, and an idle mode.

(4) The device of any of features (1) to (3), in which the controller is further configured to determine a charging limit value or a discharging limit value in response to determining that the updated cost is greater than the initial cost of the operating schedule.

(5) The device of feature (4), in which the charging limit value or the discharging limit value is associated with the operating schedule.

(6) The device of any of features (1) to (5), in which the controller is further configured to forecast the load profile for the predetermined period using a neural network forecaster.

(7) The device of any of features (1) to (6), in which the controller is further configured to forecast a power-production profile of the at least one renewable energy source associated with the energy storage device for the predetermined period.

(8) The device of any of features (1) to (7), in which the predetermined period is twenty four hours.

(9) The device of any of features (1) to (8), in which the predetermined operating period is one hour.

(10) The device of any of features (1) to (9), in which the at least one renewable energy source is a photovoltaic system.

(11) The device of any of features (1) to (10), in which the controller is further configured to repeat the steps of determining an updated cost and identifying the operating mode at the end of each predetermined operating period.

(12) A method for controlling an energy storage device. The method includes determining, using processing circuitry, an operating schedule for the energy storage device based on at least an initial cost, the initial cost being a function of at least a load profile and a power production profile of at least one renewable energy source associated with the energy storage device and the operating schedule being established for a predetermined period; determining, using the processing circuitry, an updated cost based on at least the operating schedule; identifying, using the processing circuitry, an operating mode from a plurality of operating modes for a predetermined operating period based on the updated cost and the operating schedule; and operating the energy storage device in the operating mode for the predetermined operating period.

(13) The method of feature (12), in which the operating schedule includes a subset of feasible modes identified from the plurality of operating modes.

(14) The method of features (12) or (13), in which the plurality of operating modes include a charge mode from energy generated from the at least one renewable energy source, another charge mode from energy generated from an energy grid, a discharge mode at a maximum power, another discharge mode following the load profile, and an idle mode.

(15) The method of any of features (12) to (14), further including determining a charging limit value or a discharging limit value in response to determining that the updated cost is greater than the initial cost of the operating schedule.

(16) The method of feature (15), in which the charging limit value or the discharging limit value is associated with the operating schedule.

(17) The method of any of features (12) to (16), further including forecasting a load profile for the predetermined period using a neural network forecaster.

(18) The method of any of features (12) to (17), further including forecasting a power-production profile of the at least one renewable energy source associated with the energy storage device for the predetermined period.

(19) The method of any of features (12) to (18), in which the predetermined period is twenty four hours.

(20) A system includes an energy storage device and a controller. The energy storage device is configured to operate in an operating mode indicated by a control signal received from a controller. The controller is configured to determine an operating schedule for the energy storage device based on at least an initial cost, the initial cost being a function of at least a load profile and a power production profile of at least one renewable energy source associated with the energy storage device and the operating schedule being established for a predetermined period, determine an updated cost based on at least the operating schedule, identify an operating mode from the plurality of operating modes for a predetermined operating period based on the updated cost and the operating schedule, and output a control signal to the energy storage device indicating the operating mode.

(21) The system of feature (20), in which the operating schedule includes a subset of feasible modes identified from the plurality of operating modes.

(22) The system of features (20) or (21), in which the plurality of operating modes include a charge mode from energy generated from the at least one renewable energy source, another charge mode from energy generated from an energy grid, a discharge mode at a maximum power, another discharge mode following the load profile, and an idle mode.

(23) The system of any of features (20) to (22), in which the controller is further configured to determine a charging limit value or a discharging limit value in response to determining that the updated cost is greater than an the initial cost of the operating schedule.

(24) The system of feature (23), in which the charging limit value or the discharging limit value is associated with the operating schedule.

(25) The system of any of features (20) to (24), in which the controller is further configured to forecast the load profile for the predetermined period using a neural network forecaster.

(26) The system of any of features (20) to (25), in which the controller is further configured to forecast a power-production profile of the at least one renewable energy source associated with the energy storage device for the predetermined period.

(27) The system of any of features (20) to (26), in which the predetermined period is twenty four hours.

(28) The system of any of features (20) to (27), in which the predetermined operating period is one hour.

(29) The system of any of features (20) to (28), in which the at least one renewable energy source is a photovoltaic system.

(30) The system of any of features (20) to (29), in which the controller is further configured to repeat the steps of determining an updated cost and identifying the operating mode at the end of each predetermined operating period.

The invention claimed is:

1. An energy storage device, comprising:
a controller configured to
determine an operating schedule for the energy storage device and a total cost of the operating schedule for a predetermined period, the operating schedule including a plurality of operating modes;
determine a plurality of feasible modes based upon the operating schedule, the plurality of feasible modes being those of the plurality of operating modes that are not determined to be unfit for control in a predetermined operating period that is less than the predetermined period;
determine a cost for the predetermined operating period that is less than the predetermined period for each of the feasible modes;
optimize an updated cost for each of the feasible modes for a period that is (1) greater than the predetermined operating period that is less than the predetermined period and (2) less than the predetermined period based on at least the operating schedule;
determine a sum cost for each of the feasible modes by summing the respective cost for the predetermined operating period and the respective updated cost;
identify an operating mode from the plurality of feasible modes for the predetermined operating period that is less than the predetermined period based on the sum costs and the total cost; and
operate the energy storage device in the identified operating mode for the predetermined operating period that is less than the predetermined period.

2. The device of claim 1, wherein the plurality of operating modes include a charge mode from energy generated from at least one renewable energy source associated with the energy storage device, another charge mode from energy generated from an energy grid, a discharge mode at a maximum power, another discharge mode following a load profile of the at least one renewable energy source, and an idle mode.

3. The device of claim 1, wherein the controller is further configured to determine a charging limit value or a discharging limit value in response to determining that the updated cost of the identified operating mode is greater than the total cost of the operating schedule.

4. The device of claim 3, wherein the charging limit value or the discharging limit value is associated with the operating schedule.

5. The device of claim 2, wherein the controller is further configured to forecast the load profile for the predetermined period using a neural network forecaster.

6. The device of claim 2, wherein the controller is further configured to forecast a power-production profile of the at least one renewable energy source for the predetermined period.

7. The device of claim 1, wherein the predetermined period is twenty four hours.

8. The device of claim 1, wherein the predetermined operating period is one hour.

9. The device of claim 2, wherein the at least one renewable energy source is a photovoltaic system.

10. The device of claim 1, wherein the controller is further configured to repeat the steps of determining the updated costs and identifying the operating mode at the end of each predetermined operating period that is less than the predetermined period.

11. A method for controlling an energy storage device, the method comprising:
- determining, using processing circuitry, an operating schedule for the energy storage device and a total cost of the operating schedule for a predetermined period, the operating schedule including a plurality of operating modes;
- determining, using the processing circuitry, a plurality of feasible modes based upon the operating schedule, the plurality of feasible modes being those of the plurality of operating modes that are not determined to be unfit for control in a predetermined operating period that is less than the predetermined period;
- determining, using the processing circuitry, a cost for the predetermined operating period that is less than the predetermined period for each of the feasible modes;
- optimizing, using the processing circuitry, an updated cost for each of the feasible modes for a period that is (1) greater than the predetermined operating period that is less than the predetermined period and (2) less than the predetermined period based on at least the operating schedule;
- determining, using the processing circuitry, a sum cost for each of the feasible modes by summing the respective cost for the predetermined operating period and the respective updated cost;
- identifying, using the processing circuitry, an operating mode from the plurality of feasible modes for the predetermined operating period that is less than the predetermined period based on the sum costs and the total cost; and
- operating the energy storage device in the identified operating mode for the predetermined operating period that is less than the predetermined period.

12. The method of claim 11, wherein the plurality of operating modes include a charge mode from energy generated from at least one renewable energy source associated with the energy storage device, another charge mode from energy generated from an energy grid, a discharge mode at a maximum power, another discharge mode following a load profile of the at least one renewable energy source, and an idle mode.

13. The method of claim 11, further comprising determining a charging limit value or a discharging limit value in response to determining that the updated cost of the identified operating mode is greater than the total cost of the operating schedule.

14. The method of claim 13, wherein the charging limit value or the discharging limit value is associated with the operating schedule.

15. The method of claim 12, further comprising forecasting a load profile for the predetermined period using a neural network forecaster.

16. The method of claim 12, further comprising forecasting a power-production profile of the at least one renewable energy source for the predetermined period.

17. The method of claim 11, wherein the predetermined period is twenty four hours.

18. A system, comprising:
- an energy storage device configured to operate in an operating mode indicated by a control signal received from a controller; and
- the controller configured to
  - determine an operating schedule for the energy storage device and a total cost of the operating schedule for a predetermined period, the operating schedule including a plurality of operating modes,
  - determine a plurality of feasible modes based upon the operating schedule, the plurality of feasible modes being those of the plurality of operating modes that are not determined to be unfit for control in a predetermined operating period that is less than the predetermined period,
  - determine a cost for the predetermined operating period that is less than the predetermined period for each of the feasible modes,
  - optimize an updated cost for each of the feasible modes for a period that is (1) greater than the predetermined operating period that is less than the predetermined period and (2) less than the predetermined period based on at least the operating schedule,
  - determine a sum cost for each of the feasible modes by summing the respective cost for the predetermined operating period and the respective updated cost,
  - identify an operating mode from the plurality of feasible modes for the predetermined operating period that is less than the predetermined period based on the sum costs and the total cost, and
  - output a control signal to the energy storage device indicating the identified operating mode.

19. An energy storage device, comprising:
- circuitry configured to:
  - operate the energy storage device in one of at least nine modes at a time, each of the at least nine modes being different, being separately selectable with respect to one another for operating the energy storage device, and having preset operating parameters; and
  - calculate power output of the energy storage device in a different manner for each of the at least nine modes, wherein
- the at least nine modes include:
  - a first charge mode from energy generated from at least one renewable energy source without a charging limit,
  - a second charge mode from energy generated from the at least one renewable energy source with the charging limit,
  - a third charge mode from energy generated from an energy grid without the charging limit,
  - a fourth charge mode from energy generated from the energy grid with the charging limit,
  - a first discharge mode at a maximum power without a discharging limit,
  - a second discharge mode at the maximum power with a discharging limit,
  - a third discharge mode following a load profile without the discharging limit,
  - a fourth discharge mode following the load profile with the discharging limit, and
  - an idle mode,
- for the first charge mode, the power output of the energy storage device is calculated as the maximum of:
  - (a) zero, and
  - (b) the minimum of (i) an output of the at least one renewable energy source minus a load of the at least one renewable energy source and (ii) a maximum state of charge of the energy storage device minus a current state of charge of energy storage device,
- for the second charge mode, the power output of the energy storage is device calculated as the maximum of:
  - (a) zero, and
  - (b) the minimum of (i) the output of the at least one renewable energy source minus the load of the at least one renewable energy source, (ii) the maximum state of charge of the energy storage device minus the current state of charge of energy storage device, and (iii) the charging limit, for the third charge mode, the power output of the energy storage device is calculated as the minimum of:
(a) a maximum power of the energy storage device, and
(b) the maximum state of charge of the energy storage device minus the current state of charge of energy storage device, for the fourth charge mode, the power output of the energy storage device is calculated as the minimum of:
(a) the maximum power of the energy storage device,
(b) the maximum state of charge of the energy storage device minus the current state of charge of energy storage device, and
(c) the charging limit, for the first discharge mode, the power output of the energy storage device is calculated as the minimum of:
(a) the maximum power of the energy storage device, and
(b) the current state of charge of energy storage device minus a minimum state of charge of the energy storage device, for the second discharge mode, the power output of the energy storage device is calculated as the minimum of:
(a) the maximum power of the energy storage device,
(b) the current state of charge of energy storage device minus the minimum state of charge of the energy storage device, and
(c) the discharging limit, for the third discharge mode, the power output of the energy storage device is calculated as the maximum of:
(a) zero, and
(b) the maximum of (i) the load of the at least one renewable energy source minus the output of the at least one renewable energy source, (ii) the maximum power of the energy storage device, and (iii) the current state of charge of energy storage device minus the minimum state of charge of the energy storage device, for the fourth discharge mode, the power output of the energy storage device is calculated as the maximum of:
(a) zero, and
(b) the maximum of (i) the load of the at least one renewable energy source minus the output of the at least one renewable energy source, (ii) the maximum power of the energy storage device, (iii) the current state of charge of energy storage device minus the minimum state of charge of the energy storage device, and (iv) the discharging limit, and for the idle mode, the power output of the energy storage device is calculated as zero.

* * * * *